July 27, 1965  J. INGRAM ET AL  3,196,609
GAS TURBINE BY-PASS ENGINE
Filed Aug. 16, 1962  2 Sheets-Sheet 1
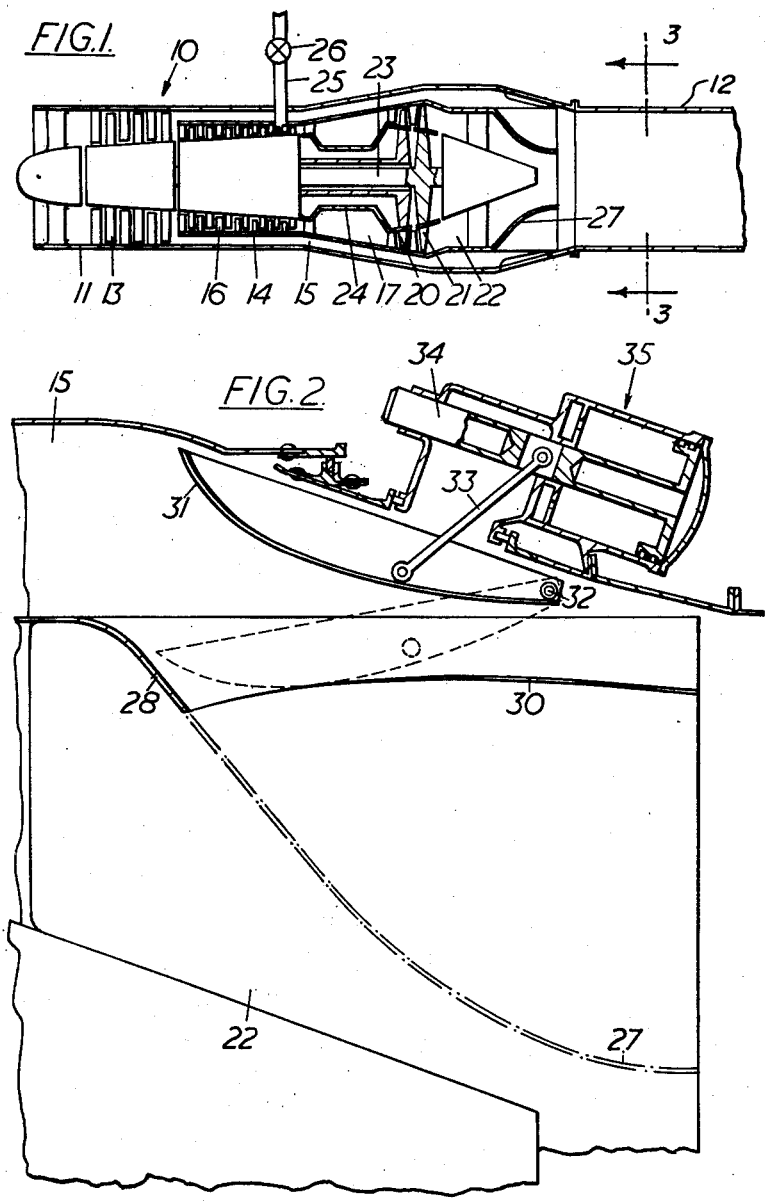
Inventors
John Ingram
Martin Land
Donald McLean
By Cushman, Darby & Cushman
Attorneys

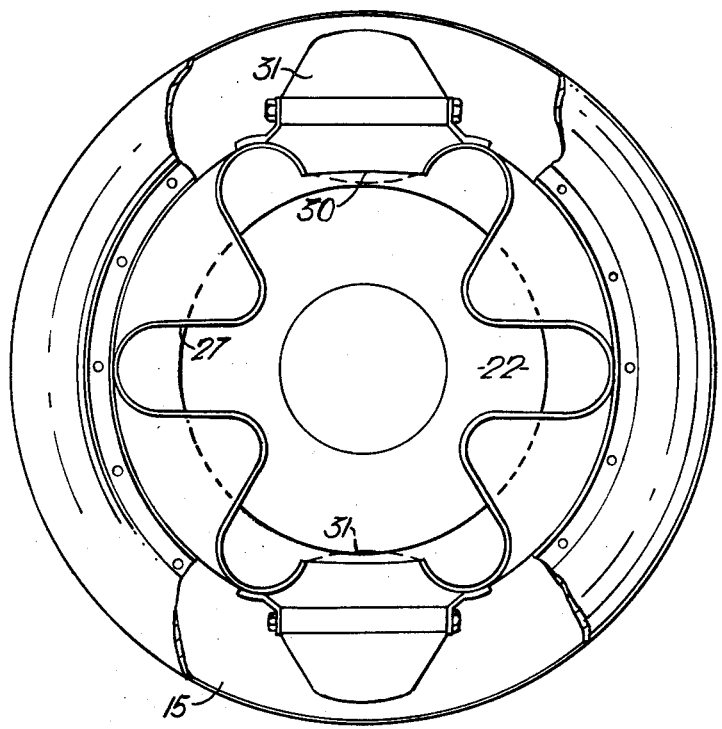

United States Patent Office 3,196,609
Patented July 27, 1965

3,196,609
GAS TURBINE BY-PASS ENGINE
John Ingram, Mickleover, Derby, Martin Land, Smalley, and Donald McLean, Derby, England, assignors to Rolls-Royce Limited, Derby, England, a company of Great Britain
Filed Aug. 16, 1962, Ser. No. 217,441
Claims priority, application Great Britain, Aug. 18, 1961, 29,960
11 Claims. (Cl. 60—35.6)

This invention concerns a gas turbine by-pass engine.

According to the present invention, there is provided a gas turbine by-pass engine having in flow series compressor means, combustion equipment, turbine means, a turbine exhaust duct, and a jet pipe; an ancillary air duct and a by-pass duct each of which is arranged to receive air compressed by the compressor means; conduit means for introducing by-pass air from the by-pass duct into the jet pipe to mix with the turbine exhaust gases therein; and means, operable when compressed air is being drawn off through the ancillary air duct, for altering the ratio of the effective flow areas of the conduit means and of the turbine exhaust duct so as to maintain the by-pass ratio substantially constant.

The term "turbine exhaust duct" as used in this specification is to be understood to refer to a duct which is adapted for the flow therethrough of the turbine exhaust gases but which is arranged upstream of the area in which these gases mix with the by-pass air.

The term "by-pass ratio" as used in this specification is to be understood to mean the ratio of the mass flows per unit time of the turbine exhaust gases and of the by-pass air.

Preferably the means for altering the ratio of the said effective flow areas comprises means for increasing the effective flow area of the turbine exhaust duct.

The means for altering the ratio of the said effective flow areas, in addition to increasing the effective flow area of the turbine exhaust duct, preferably also reduces the effective flow area of the conduit means to such an extent that the flow of by-pass air through the by-pass duct is reduced by an amount substantially corresponding to the amount of air flowing through the ancillary air duct.

The said conduit means preferably comprises a plurality of angularly spaced apart chutes, there being valve means movable between closed and open positions in which flow through a minor proportion of the said chutes is respectively prevented and permitted, all the said chutes extending into the path of the turbine exhaust gases but the chute or chutes constituting the said minor proportion extending into the path of the turbine exhaust gases to a substantially smaller extent than the remaining chutes.

The chute or chutes constituting the said minor proportion preferably have a shape which is substantially identical to the shape of the upstream portions of the said remaining chutes.

The said minor proportion is preferably constituted by two diametrically oppositely disposed chutes.

Preferably the valve means of each of the chutes of the said minor proportion is movable between the said closed and open positions by a ram operated by air from the compressor means.

The invention also comprises an aircraft provided with a gas turbine by-pass engine as set forth above, the said ancillary air duct being used to provide air which is employed for controlling the flight attitude of the aircraft. Thus the air may be employed for boundary layer control to assist landing and take-off.

The invention is illustrated, merely by way of example, in the accompanying drawings in which:

FIGURE 1 is a diagrammatic section through a gas turbine by-pass engine according to the present invention, FIGURE 2 is a section, on a larger scale, through part of the engine of FIGURE 1, and FIGURE 3 is a sectional view, on a larger scale, taken substantially on line 3—3 of FIGURE 1, the turbin blades and tubine vane being eliminated for the purpose of clarity.

Referring to the drawings, a gas turbine by-pass engine 10, which is adapted to be employed as a forward propulsion engine of an aircraft (not shown) comprises an outer casing 11 whose downstream end is secured to a jet pipe 12. Mounted within the upstream end portion of the outer casing 11 is a low pressure compressor 13.

Mounted within the outer casing 11, on the downstream side of the low pressure compressor 13, is an inner casing 14 which defines with the outer casing 11 an annular by-pass duct 15, the by-pass duct 15 being arranged to receive part of the air compressed by the compressor 13.

Within the inner casing 14 there are arranged in flow series a high pressure compressor 16, which is disposed immediately downsteam of and receives the greater part of the air compressed by the low pressure compressor 13, combustion equipment 17, a high pressure turbine 20 and a low pressure turbine 21. The turbine exhaust gases, which have passed through the turbines 20, 21, flow to the jet pipe 12 through a turbine exhaust duct 22 which is formed within the downstream portion of the inner casing 14.

The low pressure compressor 13 and the low pressure turbine 21 are mounted on a common shaft 23 which is itself mounted concentrically within a shaft 24 on which are mounted the high pressure compressor 16 and the high pressure turbine 20.

An ancillary air duct 25, the flow through which is controlled by a valve 26, communicates with an intermediate stage of the high pressure compressor 16 so as to be adapted to receive part of the air compressed in the high pressure compressor 16. The ancillary air duct 25 is adapted to supply air for boundary layer control on the said aircraft to assist landing and take-off.

At the downstream end of the by-pass duct 15 there are angularly spaced apart chutes 27, 28 which lead the by-pass air flowing through the by-pass duct 15 into the jet pipe 12 so as to mix therein with the turbine exhaust gases.

As will be seen from the drawings, each of the chutes 27, 28 extends into the path of the turbine exhaust gases. The chutes 28, however, are cut away at 30 so as to extend only a very short distance into the path of the turbine exhaust gases.

The chutes 28, which are constituted by two diametrically spaced apart chutes of which only one is shown in FIG. 2, are of exactly the same shape as the upstream portions of the chutes 27, eight chutes 27 being provided.

Flow through each of the chutes 28 is controlled by a valve 31 which is pivoted at 32.

Each of the valves 31 is connected by a connecting rod 33 to the piston rod 34 of a double acting ram 35. Each ram 35, which is operated (by means not shown) by air from the high pressure compressor 16, is adapted to move the respective valve 31 between an open position, shown in full lines in FIG. 2, in which air from the by-pass duct 15 may pass through the chutes 28, and a closed position, shown in dotted lines in FIG. 2, in which air from the by-pass duct 15 is prevented from passing through the chutes 28.

When the valves 31 are in the open position, the air passing through the chutes 28 passes along a similar path to the air passing through the chutes 27. The effect, therefore, of closing the valves 31 is both to decrease the effective flow area of the by-pass duct 15 by one-fifth and to increase correspondingly the effective flow area of the turbine exhaust duct 22.

The ancillary air duct 25 may be arranged to take, say, 18% of the air compressed by the compressors 13, 16. It therefore the valves 31 are closed at a time when the valve 26, which controls flow through the ancillary air duct 25, is open, the reduction by one-fifth in the flow of by-pass air through the by-pass duct 15 will be approximately equal in amount to the 18% of compressor air flowing through the ancillary air duct 25. This reduction in the effective flow area of the by-pass duct 15, in combination with the simultaneous increase in the effective flow area of the turbine exhaust duct 22, will serve to maintain the by-pass ratio at substantially the same value which it has when the valve 26 is closed and there is therefore no flow through the ancillary air duct 25.

The arrangement may be such that whenever the valve 26 is open, the valves 31 are automatically closed, and vice versa.

It will be appreciated that the increase of the effective flow area of the turbine exhaust duct 22 which occurs on closure of the valves 31 causes speeding up of the low pressure compressor 13, whereby to compensate for the loss of air through the ancillary air duct 25.

We claim:

1. A gas turbine by-pass engine having in flow series compressor means, combustion equipment, turbine means, a turbine exhaust duct, and a jet pipe; an ancillary air duct and a by-pass duct each of which is arranged to receive air compressed by the compressor means; a plurality of conduit means spaced peripherally around the jet pipe for introducing by-pass air from the by-pass duct into the jet pipe to mix with the turbine exhaust gases therein; and means operatively associated with a selected number of said plurality of conduit means for changing the flow area of the selected number of conduit means, said last-mentioned means being operable when compressed air is being drawn off through the ancillary air duct to simultaneously alter the effective flow area of the turbine exhaust duct and the effective total flow area of the plurality of conduit means whereby the by-pass ratio is maintained substantially constant, said selected number of conduit means being less than the total number of said conduit means.

2. A gas turbine by-pass engine having in flow series compressor means, combustion equipment, turbine means, a turbine exhaust duct, and a jet pipe; an ancillary air duct and a by-pass duct each of which is arranged to receive air compressed by the compressor means; a plurality of conduit means spaced peripherally around the jet pipe for introducing by-pass air from the by-pass duct into the jet pipe to mix with the turbine exhaust gases therein; and means operatively associated with a selected number of said plurality of conduit means for changing the flow area of the selected number of conduit means, said last-mentioned means being operable when compressed air is being drawn off through the ancillary air duct to simultaneously increase the effective flow area of the turbine exhaust duct and decrease the total effective flow area of the plurality of conduit means whereby the bypass ratio is maintained substantially constant, said selected number of conduit means being less than the total number of said conduit means.

3. A gas turbine by-pass engine having in flow series compressor means, combustion equipment, turbine means, a turbine exhaust duct, and a jet pipe; an ancillary air duct and a by-pass duct each of which is arranged to receive air compressed by the compressor means; a plurality of conduit means spaced peripherally around the jet pipe for introducing by-pass air from the by-pass duct into the jet pipe to mix with the turbine exhaust gases therein; and means operatively associated with a selected number of said conduit means for changing the effective area of the selected number of conduit means, said last-mentioned means being operable when compressed air is being drawn off through the ancillary air duct to simultaneously increase the effective flow area of the turbine exhaust duct and reduce the effective total flow area of the conduit means to an extent where the flow of by-pass air through th by-pass duct is reduced by an amount substantially corresponding to the amount of air flowing through the ancillary air duct, said selected number of conduit means being less than the total flow of said conduit means.

4. A gas turbine engine comprising: compressor means, combustion equipment, turbine means, a turbine exhaust duct and a jet pipe in flow series; an ancillary air duct and a by-pass duct each of which is arranged to receive air compressed by said compressor means; a plurality of angularly spaced apart chutes all in communication with said by-pass duct and with the upstream end of said jet pipe, said angularly spaced apart chutes extending radially inwardly into the path of the turbine exhaust gases, with at least a minor proportion of the chutes extending radially inwardly a less distance than the remaining chutes, selectively operable valve means associated with each of the minor proportions of the chutes extending radially inwardly a lesser amount for opening and closing the same; said valve means when closing said minor proportion of said chutes causing a decrease in total effective area of said chutes with an increase in total effective area of the turbine exhaust duct.

5. A gas turbine engine as claimed in claim 4 in which the amount of air flowing through said chutes is reduced from the maximum amount when said valve means is open by an amount substantially equal to the amount of air flowing through said ancillary duct so as to maintain the by-pass ratio of the engine substantially constant.

6. A gas turbine engine as claimed in claim 4 in which said ancillary air duct is arranged to bleed in the order of 18% of the compressed air from said compressor means and wherein said chutes of lesser length when closed by said valve means reduces the effective flow of the by-pass air in said by-pass duct in the order of one-fifth, the effective flow of by-pass air being reduced approximately the same as the amount of flow of air through said ancillary air duct so as to maintain the by-pass ratio of the engine substantially constant.

7. A gas turbine engine as claimed in claim 4 wherein the minor proportions of said chutes have a shape substantially identical to the shape of the upstream end of the remaining chutes whereby flow of air through the minor proportion of chutes pass along a similar path to air passing through the remaining chutes.

8. A gas turbine by-pass engine having in flow series compressor means, combustion equipment, turbine means, a turbine exhaust duct, and a jet pipe; an ancillary air duct and a by-pass duct each of which is arranged to receive air compressed by the compressor means; a plurality of angularly spaced apart chutes all of which communicate with the by-pass duct; valve means movable between closed and open positions in which flow through at least one of said chutes which constitutes a minor proportion of the total of said chutes is respectively prevented and permitted, all the said chutes extending into the path of the turbine exhaust gases but the at least one chute constituting the said minor proportion extending into the path of the turbine exhaust gases to a substantially smaller extent than the remaining chutes, closure of the said valve means causing an increase in the effective flow area of the turbine exhaust duct, and a reduction in the total effective flow area of the chutes so that the flow of by-pass air through the by-pass duct is reduced by an amount substantially corresponding to the amount of air flowing through the ancillary air duct; and means for moving the said valve means between the closed and open positions.

9. A gas turbine by-pass engine having in flow series compressor means, combustion equipment, turbine means, a turbine exhaust duct, and a jet pipe; an ancillary air duct and a by-pass duct each of which is arranged to receive air compressed by the compressor means; a plurality of angularly spaced apart chutes all of which communicate with the by-pass duct; valve means movable between closed and open positions in which flow through at least one of said chutes which constitutes a minor proportion of the total of said chutes is respectively prevented and permitted, the at least one chute constituting the said minor proportion having a shape which is substantially identical to the shape of the upstream portions of the said remaining chutes, all the said chutes extending into the path of the turbine exhaust gases but the at least one chute constituting the said minor proportion extending into the path of the turbine exhaust gases to a substantially smaller extent than the remaining chutes, closure of the said valve means causing an increase in the effective flow area of the turbine exhaust duct, and a reduction in the total effective flow area of the chutes so that the flow of by-pass air through the by-pass duct is reduced by an amount substantially corresponding to the amount of air flowing through the ancillary air duct; and means for moving the said valve means between the closed and open positions.

10. A gas turbine by-pass engine as claimed in claim 9 in which the said minor proportion is constituted by two diametrically oppositely disposed chutes.

11. A gas turbine by-pass engine as claimed in claim 9 in which the valve means of each of the chutes of the said minor proportion is movable between the said closed and open positions by a ram operated by air from the compressor means.

References Cited by the Examiner
UNITED STATES PATENTS 2,551,229   5/51   Alford et al.
2,753,685   7/56   Mattinson.
3,108,767   10/63   Eltis et al. _____ 60—35.6 X MARK NEWMAN, *Primary Examiner*.

JULIUS E. WEST, SAMUEL LEVINE, *Examiners*.